United States Patent [19]

Jaunin

[11] 4,236,236
[45] Nov. 25, 1980

[54] TIMEPIECE COMBINED WITH A THERMOMETER

[75] Inventor: Jean-Pierre Jaunin, La Neuveville, Switzerland

[73] Assignee: Societe Suisse pour l'Industrie Horlogere Management Services S.A., Bienne, Switzerland

[21] Appl. No.: 35,760

[22] Filed: May 3, 1979

[51] Int. Cl.³ ............................................. G04B 37/12
[52] U.S. Cl. .................................... 368/11; 368/185; 368/200; 368/202
[58] Field of Search ............... 58/23 R, 23 AC, 50 R, 58/85.5, 152 A

[56] References Cited

U.S. PATENT DOCUMENTS

| | | | |
|---|---|---|---|
| 3,166,742 | 1/1965 | Sherwin | 58/50 R X |
| 3,707,071 | 12/1972 | Walton | 58/50 R |
| 3,772,874 | 11/1973 | Lefkowitz | 58/50 R |
| 3,925,777 | 12/1975 | Clark | 58/23 R X |
| 3,937,004 | 2/1976 | Natori et al. | 58/50 R X |
| 3,999,370 | 12/1976 | Morokawa et al. | 58/23 R |
| 4,015,208 | 3/1977 | Hammer et al. | 58/23 AC X |

Primary Examiner—Ulysses Weldon
Attorney, Agent, or Firm—Griffin, Branigan & Butler

[57] ABSTRACT

An electronic timepiece displaying both the time and the temperature. A transducer which may take two positions is provided to reach this result: the first position incorporates the transducer within the timepiece and allowing the correction of the frequency drift of the time base which determines the time the second position projecting the transducer out of the timepiece case in order to measure, for example, the temperature of the ambient air. There is also provided an automatic switching system which adapts the transducer to the frequency correction or to the temperature measurement depending on the position of said transducer.

8 Claims, 5 Drawing Figures

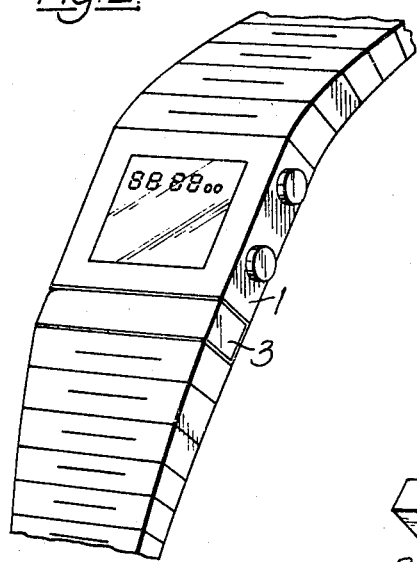
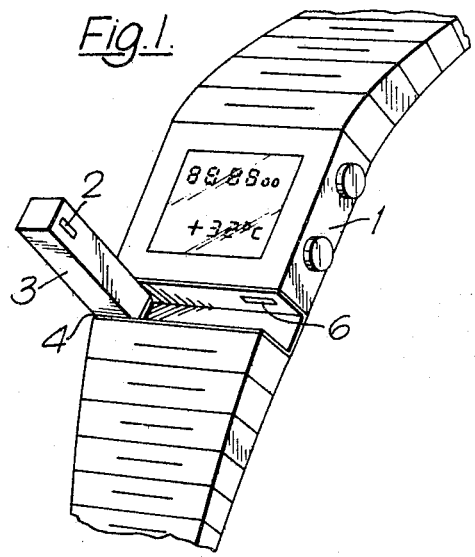
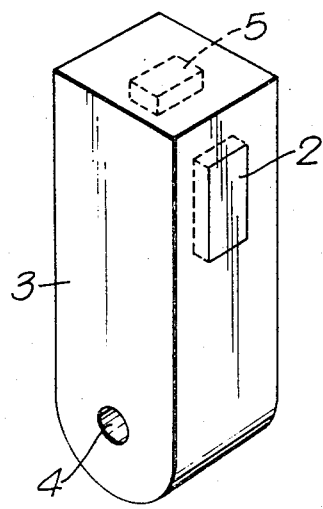

TIMEPIECE COMBINED WITH A THERMOMETER

BACKGROUND OF THE INVENTION

The invention concerns a timepiece having means to display the time and means to measure and to display the temperature.

Several timepieces of like purpose have been previously proposed. For example, a mechanical watch provided with an alcohol thermometer is known which comprises an annular tube and a container disposed concentrically to the hand axis. Since this system requires considerable space in the watch case, it will be understood that the thermometer will always indicate the temperature of the case and that, if the watch is worn, the ambient temperature will be inaccurate.

Other proposals concerning electronic watches with digital display have been disclosed using such display to measure physical quantities such as gas concentration or noise level or even temperature, but none of them concern the dual use of the temperature sensor, as will be explained below.

SUMMARY OF THE INVENTION

It is the purpose of the invention to eliminate the above-mentioned drawbacks and to benefit from the presence of the temperature sensor to attain a further goal than the sole measurement of the ambient temperature.

Thus, a further object of the invention is to measure the temperature of the ambient air independently of that of the watch case.

Still a further object of the invention is to compensate the frequency drift of the oscillator due to temperature variations of the watch case.

Still another object of the invention is to propose a device which is compact, aesthetic and which cannot be lost.

BRIEF DESCRIPTION OF THE DRAWINGS

FIG. 1 shows a perspective view of the timepiece with the transducer support projecting out of the timepiece case according to the invention.

FIG. 2 shows the same view with the timepiece embedded within the timepiece case.

FIG. 3 is an enlarged view showing the transducer with its support.

DETAILED DESCRIPTION OF THE INVENTION

Figure 4:
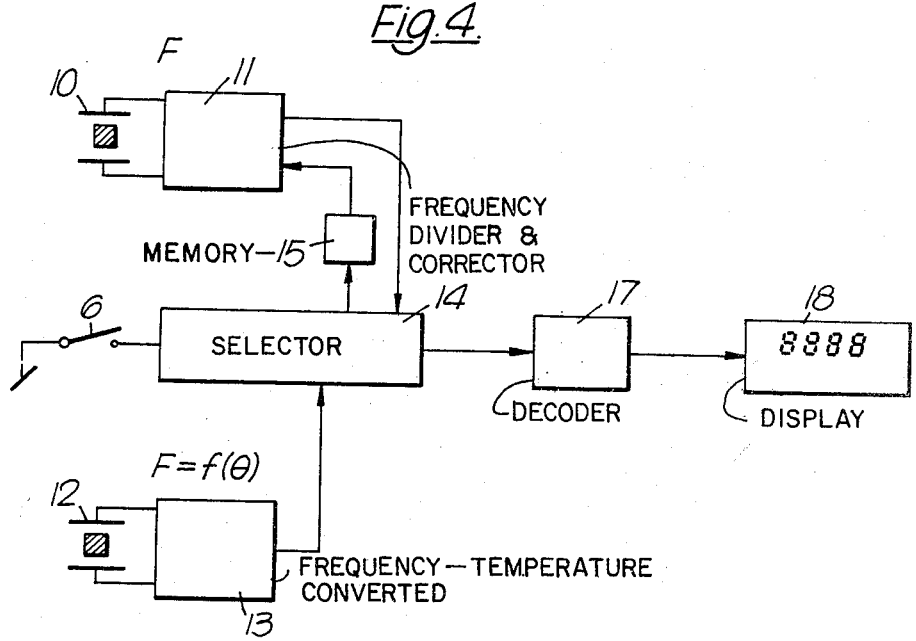
FIG. 4 is a block diagram of the electronic circuit.

FIGS. 1 and 2 represent in a perspective view a timepiece 1 having a digital display which may be liquid crystal or light emitting diodes. To this timepiece is adapted a transducer 2 able to transform a temperature to an electrical signal. The support 3 which supports the transducer may take two positions, the first where it projects out of the timepiece case (FIG. 1) and the second where it is embedded within said timepiece case (FIG. 2). In these figures one sees that the support 3 may pivot about an axis 4 in order to take either of said described positions. The invention is not limited however, to this embodiment and another execution could be envisaged provided that in one position the transducer is distinctly disengaged from the timepiece case and in the other position is within said case.

FIG. 3 is an enlarged and detailed view showing the transducer with its support. The transducer 2 is located flush with a wall of the support. This arrangement is necessary to reduce as far as possible the thermic time constant of the temperature sensor. Thus, when the latter is embedded within the watch case (FIG. 2) it will rapidly measure the temperature of said case, as similarly, when it projects out of the case, the temperature of ambient air.

To the transducer support may be associated an automatic functional switching device. Indeed, according to the invention one seeks to compensate the frequency drift of the oscillator when the support lies in the position as shown in FIG. 2. Similarly, when this support is projected as shown in FIG. 1 one seeks to measure and display the temperature of the ambient air. The switching device could be an electro-mechanical contact attached to the pivot axis 4 of the support. In a preferred embodiment of the invention, the support 3 comprises a small permanent magnet 5, the flux of which acts on an element 6 which is situated within the watch case. This element is sensible to the magnetic flux and may be a reed-switch or a Hall sensor. Thus, when the support is embedded in the watch case, the element 6 is activated thus effecting the correction of the frequency drift of the time base. When said support projects, the same element 6 is disactivated effecting the measurement and the display of the ambient temperature.

The timepiece according to the invention is equipped with a quartz crystal which gives the time base as well known. Generally, this quartz is cut to give its reference frequency, for example 32 kHz, at 25° C. If the temperature varies, the frequency will also vary, according to the law depending on the quartz type, for example, according to a parabolic function for a 32 kHz quartz with a constant of about $-0,04$ ppm/°$C.^2$. To correct this frequency drift several types of transducer may be used as temperature sensor. Quartz crystals or semiconductors are the best adapted to the proposed purpose according to the invention. In both cases, the signal emitted by the transducer is utilized either to compensate the frequency drift of the time base when said transducer is embedded in the watch case or to measure the ambient temperature when the same transducer projects out of said case.

FIG. 4 shows the block diagram of the electronic circuit according to the invention. The quartz oscillator 10 is connected in a known manner to a frequency divider 11 which further comprises a frequency corrector circuit. The quartz transducer 12 is connected to an oscillator and frequency-temperature converter 13. The correction signal is sent via a selector 14 to a memory circuit 15 then to the corrector circuit 11, if the transducer is embedded in the watch case. In this situation the switch 6 is closed, because activated by the permanent magnet 5. The selector 14 directs the time data to a decoder 17 and finally to the display 18.

In the case where the transducer projects out of the watch case, the switch 6 is open. In this situation the selector 14 sends directly the ambient temperature data to the display 18 via the circuit 17. In this case the last information concerning the case temperature is stored in the circuit 15 in order to permit the oscillator 10, 11 to continue to work without disturbance. It will be appreciated that the temperature correction can be made in a continuous manner or at predetermined intervals. At any rate the circuit 15 will store the last correction information when the transducer is positioned for measuring the ambient temperature.

The invention is not limited to a single display, alternating between the ambient temperature or the time, depending on the switch position. The display may comprise two portions, the first displaying permanently the time and the second displaying the ambient temperature only when the switch 6 is open.

Figure 5:
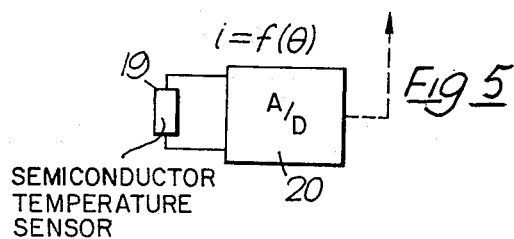
FIG. 5 is a block diagram of a modified embodiment of a portion of the circuit of FIG. 4.

FIG. 5 shows a semi-conductor 19 which may be used as a temperature sensor. In this further embodiment the output current of the semi-conductor is temperature dependent. In this case the circuit 20 comprises an analogue-digital converter connected in turn to the selector circuit 14.

What is claimed is:

1. Electronic timepiece including a time means for measuring and displaying time, and a temperature means for measuring temperature, said temperature means being electronically coupled to said time means;

said temperature means including a temperature transducer for measuring the temperature and transforming the temperature into an electrical signal and a mount for mounting said transducer to the rest of said electronic timepiece, said mount allowing movement of said transducer to assume either a first or a second position relative to said rest of said electronic timepiece, the first position being juxtaposed to certain other parts of the timepiece in order to measure the temperature of said certain other parts as an indication of the frequency drift caused by temperature variations within said timepiece, said second position being substantially away from said certain other parts of said timepiece to measure another temperature, for example that of ambient air; and, said time means including a correcting means for receiving said electrical signal from said transducer when said transducer is in said first position and correcting the time display in response to said electronic signal.

2. Electronic timepiece as set forth in claim 1 wherein is further included a timepiece case for enclosing said timepiece and wherein said transducer is within the timepiece case in said first position, but projects out of the timepiece case in said second position.

3. Electronic timepiece as in claims 1 or 2 comprising a switching means for switching said electrical signal in said time means to correct the frequency drift of a time measurement in response to said transducer being placed in said first position and for switching said electrical signal to cause said time means to display the temperature measured by said transducer in response to said transducer being placed in said second position.

4. Electronic timepiece as set forth in claims 1 or 2 wherein said time means includes two displays, one which permanently indicates the time, and the other which indicates temperature only when the transducer is in said second position.

5. Electronic timepiece as in claims 1 or 2 wherein said time means further includes a memory, said memory being adapted to store the last temperature of said transducer in said first position when said transducer is moved to said second position.

6. Electronic timepiece as in claims 1 or 2 wherein said mount is pivotal to pivot said transducer about an axis to move said transducer from said first to said second position, and wherein a support for said pivotal mount comprises a permanent magnet to perform switching functions.

7. Electronic timepiece as in claims 1 or 2 wherein said transducer comprises a quartz crystal.

8. Electronic timepiece as in claims 1 or 2 wherein said transducer comprises a semiconductor.

* * * * *